United States Patent
Shibuya

(10) Patent No.: US 12,455,527 B2
(45) Date of Patent: Oct. 28, 2025

(54) IMAGE FORMING APPARATUS

(71) Applicant: CANON KABUSHIKI KAISHA, Tokyo (JP)

(72) Inventor: Ryota Shibuya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/746,248

(22) Filed: Jun. 18, 2024

(65) Prior Publication Data

US 2024/0427280 A1  Dec. 26, 2024

(30) Foreign Application Priority Data

Jun. 23, 2023 (JP) ................................. 2023-103430

(51) Int. Cl.
| | |
|---|---|
| G03G 15/00 | (2006.01) |
| F16H 57/023 | (2012.01) |
| F16H 57/033 | (2012.01) |
| G03G 21/16 | (2006.01) |

(52) U.S. Cl.
CPC ......... *G03G 15/757* (2013.01); *F16H 57/023* (2013.01); *F16H 57/033* (2013.01); *G03G 15/6529* (2013.01); *G03G 15/80* (2013.01); *G03G 21/1647* (2013.01); *G03G 2221/1657* (2013.01)

(58) Field of Classification Search
CPC .. G03G 15/6529; G03G 15/757; G03G 15/80; G03G 21/1647; G03G 2221/1657; F16H 57/021; F16H 57/023; F16H 57/033
See application file for complete search history.

(56) References Cited

U.S. PATENT DOCUMENTS

| | | | |
|---|---|---|---|
| 10,107,362 B2 | 10/2018 | Niikawa et al. | |
| 10,649,386 B2 | 5/2020 | Fuse | |
| 2024/0152084 A1* | 5/2024 | Shibuya | G03G 15/757 |

FOREIGN PATENT DOCUMENTS

| | | |
|---|---|---|
| JP | 2008068629 A | 3/2008 |
| JP | 2018025203 A | 2/2018 |
| JP | 2018057146 A | 4/2018 |

\* cited by examiner

*Primary Examiner* — Sophia S Chen
(74) *Attorney, Agent, or Firm* — ROSSI, KIMMS & McDOWELL LLP

(57) ABSTRACT

An image forming apparatus includes a driven member, a frame body, a driving source, and a drive transmission unit including a gear train including a first gear configured to rotate by the driving force from the driving source, and a gear cover configured to cover the gear train. The gear cover includes an outer surface that extends in an orthogonal direction orthogonal to a rotational axis direction of the first gear, and a first concave portion. The first gear includes a shaft portion that passes through a first hole formed on the first concave portion. A downstream end, in the second direction, of the shaft portion is arranged upstream of a virtual surface in the second direction.

27 Claims, 9 Drawing Sheets

IMAGE FORMING APPARATUS

BACKGROUND OF THE INVENTION

Field of the Invention

The present invention relates to image forming apparatuses for forming images on sheets.

Description of the Related Art

Japanese Patent Application Laid-Open Publication No. 2018-57146 discloses an image forming apparatus equipped with a driving device, the image forming apparatus including a side plate, a stay fixed to the side plate, a motor fixed to the stay, and an idler gear attached to a support shaft supported by the side plate and the stay.

However, according to the driving device disclosed in Japanese Patent Application Laid-Open Publication No. 2018-57146, the support shaft, the idler gear, and the stay are arranged on an outer side of the side plate, and the motor is further arranged on the outer side of the stay, in the axial direction of the idler gear. Therefore, the size of the apparatus was increased in the direction of the rotational axis.

SUMMARY OF THE INVENTION

According to a first aspect of the present invention, an image forming apparatus configured to form an image on a sheet includes a driven member, a frame body configured to support the driven member, a driving source configured to generate a driving force, and a drive transmission unit configured to transmit the driving force of the driving source to the driven member, the drive transmission unit including a gear train including a first gear configured to rotate by the driving force from the driving source, and a gear cover configured to cover the gear train. The gear cover includes an outer surface that extends in an orthogonal direction orthogonal to a rotational axis direction of the first gear, and a first concave portion that is concaved in a first direction parallel to the rotational axis direction from the outer surface, the gear cover being arranged upstream of the frame body in the first direction. The first gear includes a shaft portion that passes through a first hole formed on the first concave portion and that protrudes to a second direction opposite to the first direction from the first hole. The outer surface is a surface having a maximum area in the orthogonal direction among surfaces of the gear cover facing the second direction. A downstream end, in the second direction, of the shaft portion is a most downstream end of the gear train in the second direction and is arranged upstream of a virtual surface in the second direction, the virtual surface being positioned at a distance shifted to the second direction for a distance corresponding to a plate thickness of the gear cover from the outer surface, the virtual surface being extended in the orthogonal direction.

According to a second aspect of the present invention, an image forming apparatus configured to form an image on a sheet includes a driven member, a frame body configured to support the driven member, a driving source configured to generate a driving force, and a drive transmission unit configured to transmit the driving force of the driving source to the driven member, the drive transmission unit including a gear train including a gear configured to rotate by the driving force from the driving source, a gear cover configured to cover the gear train, and a bearing member configured to rotatably support a shaft portion of the gear. The gear cover includes an outer surface that extends in an orthogonal direction orthogonal to a rotational axis direction of the gear, and a concave portion that is concaved in a first direction parallel to the rotational axis direction from the outer surface, the gear cover being arranged upstream of the frame body in the first direction. The bearing member includes a protruded portion that passes through a hole formed on the concave portion and that protrudes to a second direction opposite to the first direction from the hole. The outer surface is a surface having a maximum area in the orthogonal direction among surfaces of the gear cover facing the second direction. A downstream end, in the second direction, of the protruded portion is arranged upstream of a virtual surface in the second direction, the virtual surface being positioned at a distance shifted to the second direction for a distance corresponding to a plate thickness of the gear cover from the outer surface, the virtual surface being extended in the orthogonal direction.

Further features of the present invention will become apparent from the following description of exemplary embodiments with reference to the attached drawings.

DESCRIPTION OF THE EMBODIMENTS

Entire Configuration of Image Forming Apparatus

Figure 1:
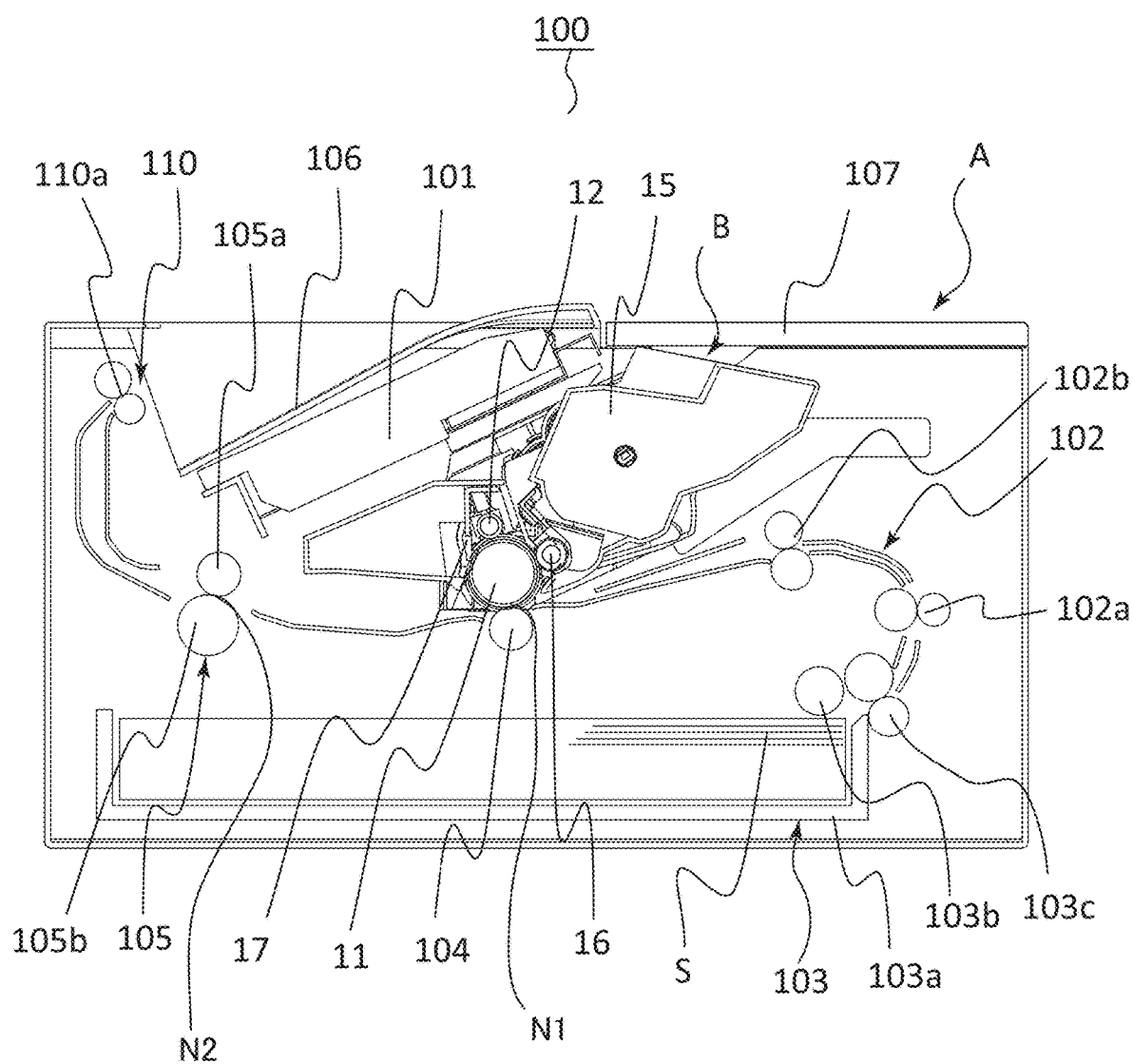
FIG. 1 is a cross-sectional view illustrating an image forming apparatus according to a present embodiment.

At first, a general configuration of an image forming apparatus according to a present embodiment will be described with reference to FIG. 1. FIG. 1 is a cross-sectional view of an image forming apparatus 100. The image forming apparatus 100 according to the present embodiment is a laser printer adopting an electrophotographic system. As illustrated in FIG. 1, the image forming apparatus 100 includes an apparatus body A, and a cartridge B serving as an image forming unit.

The image forming apparatus refers to an apparatus for forming images on sheets serving as recording media based on image information entered from an external PC or image information read from a document, and includes printers, copying machines, facsimile machines, and multifunction machines. Further, the image forming apparatus may have additional apparatuses such as an optional feeder, an image reading apparatus, or a sheet processing apparatus connected to a main body thereof having an image forming function, and in such a case, the entire system having the additional apparatuses connected thereto is considered as one type of an image forming apparatus.

The apparatus body A has a laser scanner 101, a sheet conveyance unit 102, a sheet feeding unit 103, a transfer roller 104, a fixing unit 105, and a sheet discharge portion 110 disposed therein. Further, a cartridge B is attached in a detachable manner to the apparatus body A. In order to do so, the apparatus body A includes a door 107.

The cartridge B includes a photosensitive drum 11 serving as an image bearing member and a photosensitive member, a charging roller 12 serving as a charging member, a developing unit 15, and a cleaning blade 17 serving as a cleaning member. The laser scanner 101 serving as an exposing unit is disposed above the cartridge B.

The charging roller 12 is arranged to come into contact with an outer circumference surface of the photosensitive drum 11, and charges the photosensitive drum 11 through voltage application from the apparatus body A. Further, the charging roller 12 is driven to rotate with the photosensitive drum 11. The developing unit 15 is equipped with a developing roller 16 that serves as a developer bearing member that bears and conveys toner serving as a developer. The developing roller 16 is arranged to face the photosensitive drum 11.

The cleaning blade 17 is a member having elasticity that is arranged to be in contact with the outer circumference surface of the photosensitive drum 11, and cleans the surface of the photosensitive drum 11. A tip of the cleaning blade 17 comes into contact elastically with the photosensitive drum 11, and removes toner that remains after a sheet S has passed through between the photosensitive drum 11 and the transfer roller 104 from the photosensitive drum 11. Examples of the sheet S include paper such as paper sheets and envelopes, plastic films such as OHP sheets, and cloth.

The sheet feeding unit 103 includes a cassette 103a, a pickup roller 103b that feeds the uppermost sheet S stored in the cassette 103a, and a separation roller pair 103c that separates the sheets S fed by the pickup roller 103b one by one.

The sheet conveyance unit 102 includes a conveyance roller pair 102a that conveys the sheet S fed from the sheet feeding unit 103, and a registration roller pair 102b. The registration roller pair 102b conveys the sheet S to a transfer nip N1 formed between the photosensitive drum 11 and the transfer roller 104 at a matched timing with the toner image formed on the photosensitive drum 11.

The fixing unit 105 includes a fixing roller 105a heated by a heat source such as a heater, and a heating roller 105b forming a fixing nip N2 that nips the sheet between the heating roller 105b and the fixing roller 105a. The sheet S on which a toner image has been transferred at the transfer nip N1 is conveyed to the fixing unit 105, where the sheet S is heated and pressed at the fixing nip N2. Thereby, a toner image is fixed on the sheet S.

The sheet discharge portion 110 includes a sheet discharge roller pair 110a, and the sheet S on which a toner image has been fixed is discharged by the sheet discharge roller pair 110a onto a sheet discharge tray 106.

Operation of Image Forming Apparatus

Next, an operation of the image forming apparatus 100 will be described with reference to FIG. 1. The photosensitive drum 11 driven to rotate by a drive transmission configuration described later is charged uniformly to a predetermined potential by the charging roller 12. After being charged, the laser scanner 101 exposes the surface of the photosensitive drum 11 based on image information, by which the charge of the exposed portion is removed, and an electrostatic latent image is formed. Toner is supplied from the developing roller 16 to the electrostatic latent image on the photosensitive drum 11, and the image is visualized as a toner image.

Meanwhile, in parallel with such operation to form a toner image, the sheet S is fed from the sheet feeding unit 103. The sheet S fed from the sheet feeding unit 103 is conveyed to the transfer nip N1 by the registration roller pair 102b at a matched timing with the forming of the toner image on the photosensitive drum 11. When the sheet S is passed through the transfer nip N1, voltage is applied to the transfer roller 104 from the apparatus body A, and the toner image on the photosensitive drum 11 is transferred to the sheet S as an unfixed image. Thereafter, the sheet S on which the toner image has been transferred is conveyed to the fixing unit 105, where the unfixed image is heated, pressed, and fixed to the surface of the sheet S. The sheet S on which the toner image has been fixed is discharged to the sheet discharge tray 106 by the sheet discharge portion 110 and supported thereon.

Drive Configuration of Image Forming Apparatus

Figure 2:
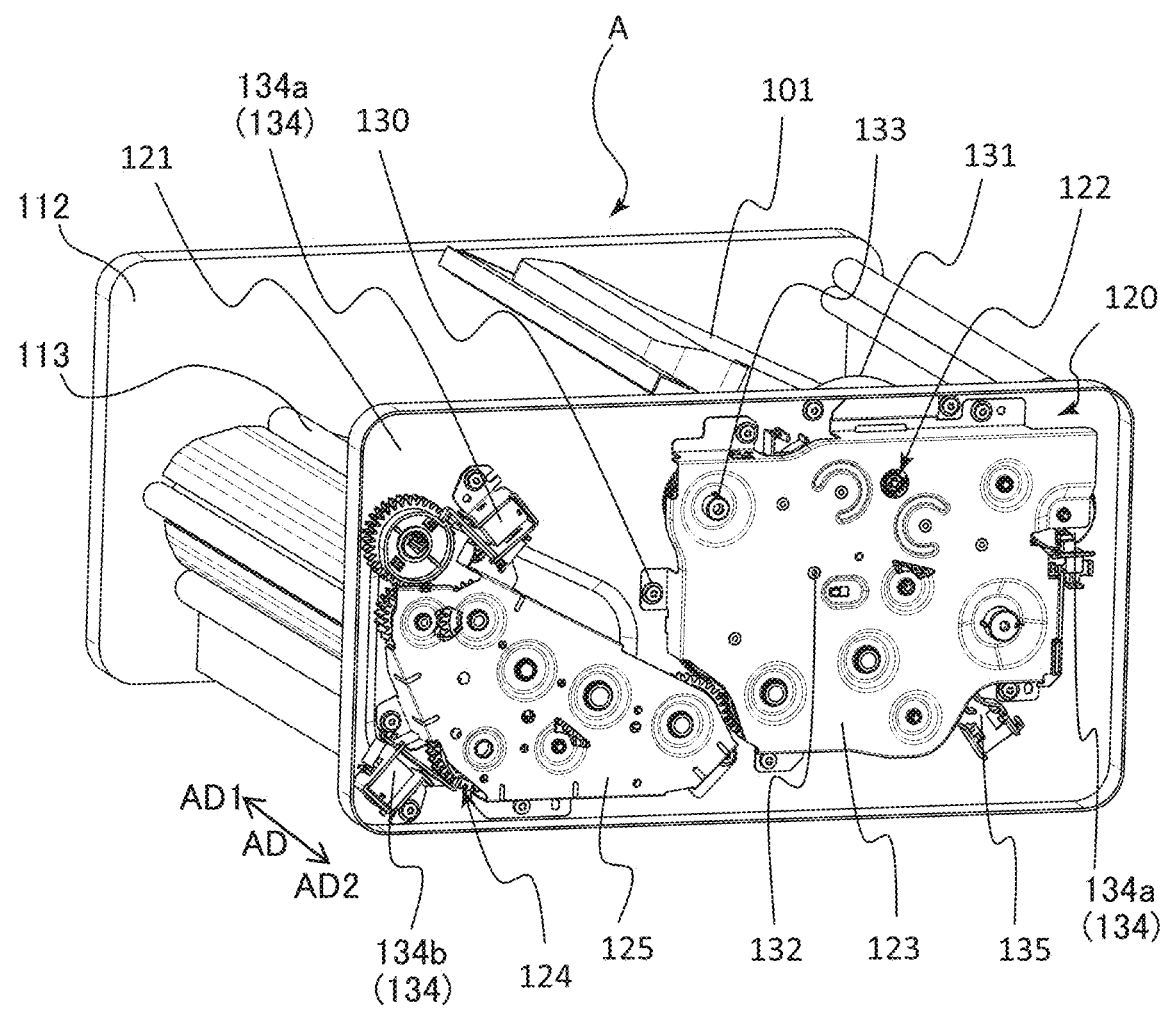
FIG. 2 is a perspective view illustrating a motor and a drive transmission unit.
Figure 3A:
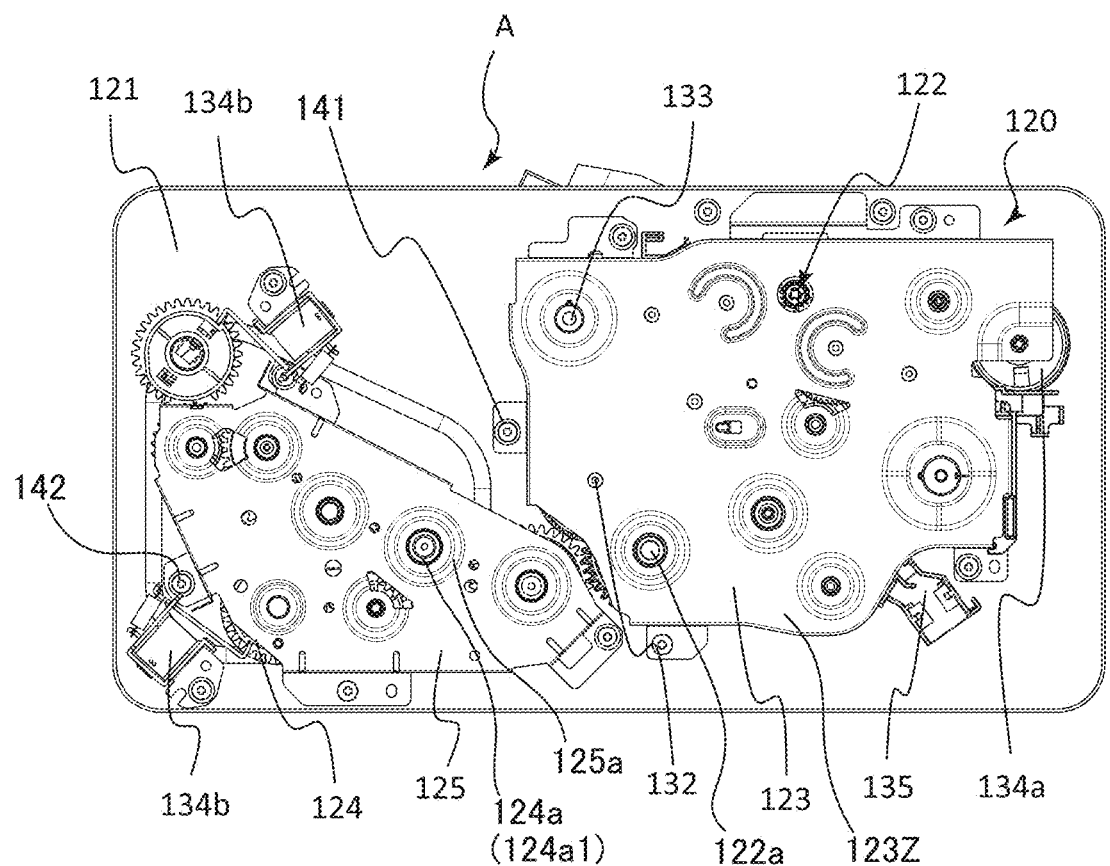
FIG. 3A is a front view illustrating the drive transmission unit.
Figure 3B:
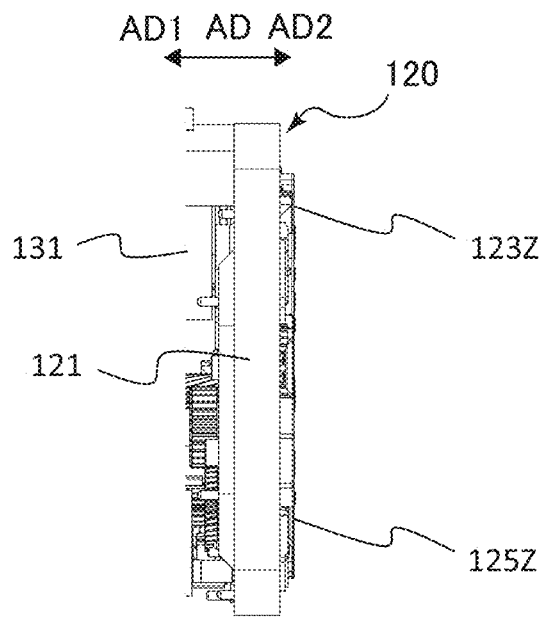
FIG. 3B is a side view illustrating the drive transmission unit.

Next, with reference to FIGS. 2 and 3, the drive configuration of the image forming apparatus 100 will be described in detail. FIG. 2 is a perspective view illustrating a motor 131 and a drive transmission unit 120 disposed on the apparatus body A. FIG. 3A is a front view illustrating the drive transmission unit 120, and FIG. 3B is a side view of the drive transmission unit 120. Further, in FIGS. 2 to 3B, the exterior member and the cartridge B of the image forming apparatus 100 are not shown.

As illustrated in FIGS. 2 to 3B, the apparatus body A includes a left side plate 112, a right side plate 121 serving as a frame body, a connecting frame 113, the motor 131 serving as a driving source supported on the right side plate 121, and the drive transmission unit 120. The left side plate 112, the right side plate 121, and the connecting frame 113 constitute a frame of the apparatus body A, and the connecting frame 113 connects the left side plate 112 and the right side plate 121. A space is formed between the left side plate 112 and the right side plate 121, in which space are arranged the cartridge B, various rollers for conveying the sheet S, and guide members for guiding the sheet S.

The drive transmission unit 120 includes a first drive gear train 122, a first gear cover 123, a second drive gear train 124, and a second gear cover 125. Further, although not shown in FIGS. 2 to 3B, an exterior right cover 126 (refer to FIG. 4B) serving as an exterior member that covers the apparatus body A is arranged on the outer side of the drive transmission unit 120. The exterior right cover 126 forms at least a part of the exterior of the image forming apparatus 100. The left side plate 112, the connecting frame 113, the right side plate 121, the first gear cover 123, and the second gear cover 125 are composed of sheet metal.

The respective gears provided on the drive transmission unit 120 are formed rotatably about a shaft that extends in a rotational axis direction AD. Further, in the following description, regarding the rotational axis direction AD, the direction from the first gear cover 123 and the second gear cover 125 toward the inner side of the image forming apparatus 100 is referred to as a first direction AD1, and a direction opposite to the first direction AD1 is referred to as a second direction AD2. Accordingly, both the first direction AD1 and the second direction AD2 are directions parallel to the rotational axis direction AD.

On the outer side in the rotational axis direction AD of the right side plate 121, the first gear cover 123 and the second gear cover 125 are attached to the right side plate 121 via screws 141 and 142. The first drive gear train 122 serving as a gear train is supported by the right side plate 121 and the first gear cover 123, and covered by the first gear cover 123. The second drive gear train 124 is supported by the right side plate 121 and the second gear cover 125, and covered by the second gear cover 125. The motor 131 is attached to an inner side of the right side plate 121 in the rotational axis direction AD. The motor 131 generates driving force. The first drive gear train 122 receives driving force of the motor 131, and transmits the driving force toward the photosensitive drum 11, the fixing unit 105, and the sheet discharge portion 110. The second drive gear train 124 receives driving force from the motor 131 via the first drive gear train 122, and transmits the driving force toward the sheet conveyance unit 102 and the sheet feeding unit 103. That is, the photosensitive drum 11, the fixing unit 105, the sheet discharge portion 110, the sheet conveyance unit 102, and the sheet feeding unit 103 are examples of a driven member driven by the driving force of the motor 131. That is, the driven member includes a roller for conveying the sheets S. The first drive gear train 122 and the second drive gear train 124 include a plurality of gears.

Further, as illustrated in FIG. 2, the drive transmission unit 120 includes a shaft 132 and a bearing member 133 that support gears rotatably, an actuator 134, and a bundle wire guide 135. In the following description, the shaft 132, the bearing member 133, the actuator 134, and the bundle wire guide 135 disposed on the first drive gear train 122 side are described as an example, but the same shaft, bearing member, actuator, and bundle wire guide are also disposed on the second drive gear train 124 side.

The shaft 132 is attached by caulk-joining to the first gear cover 123 serving as a gear cover, and arranged so as to support the gears of the first drive gear train 122. The bearing member 133 is attached to the first gear cover 123, and arranged so as to support the gear of the first drive gear train 122.

The actuator 134 includes an electromagnetic clutch 134a and a solenoid 134b, and the electromagnetic clutch 134a and the solenoid 134b are arranged downstream of the first drive gear train 122 and the second drive gear train 124 in a drive transmission direction. When power is conducted, the actuator 134 transmits the driving force of the motor 131 to the driven members, such as the photosensitive drum 11, and when power conduction is disconnected, operation is performed so as not to transmit the driving force of the motor 131 to the driven members. The bundle wire guide 135 is attached to the first gear cover 123, and guides a cable 138 (refer to FIG. 8A) for connecting the electromagnetic clutch 134a and the solenoid 134b to an electric board not shown. The actuator 134 and the bundle wire guide 135 are arranged upstream of the first gear cover 123 in the second direction AD2, that is, on the inner side in the rotational axis direction AD.

In the present embodiment, the right side plate 121, the first gear cover 123, and the second gear cover 125 are composed of sheet metal, but the present technique is not limited thereto. These members may also be made of resin.

Supporting Configuration of Gear

Next, a configuration for supporting gears 122a, 122b, and 122c among the plurality of gears disposed on the first drive gear train 122 will be described. The gear 122a is an example of a gear in which the gear 122a itself includes a gear shaft portion 122a1, that is, a gear that is not supported by the shaft 132 or the bearing member 133. The gear 122b is an example of a type of gear that is rotatably supported on the shaft 132 that passes through the gear 122b. The gear 122c is one type of gear that is rotatably supported on the bearing member 133.

Supporting Configuration of Gear Shaft Portion

Figure 4A:
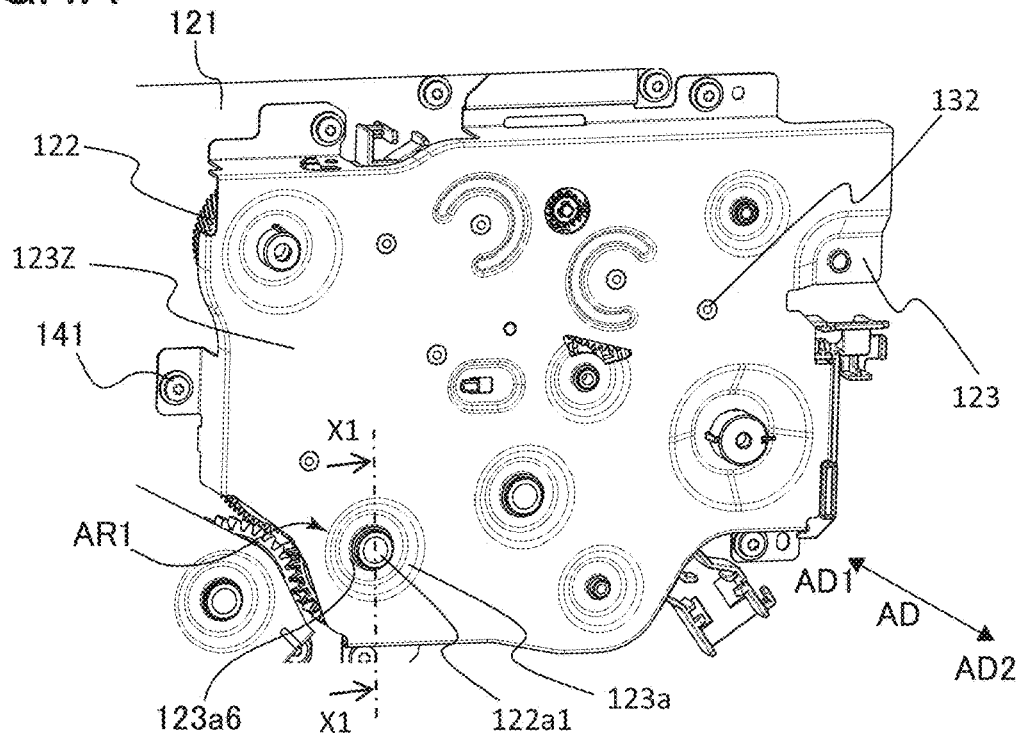
FIG. 4A is a perspective view illustrating a first drive gear train and a first gear cover.
Figure 4B:
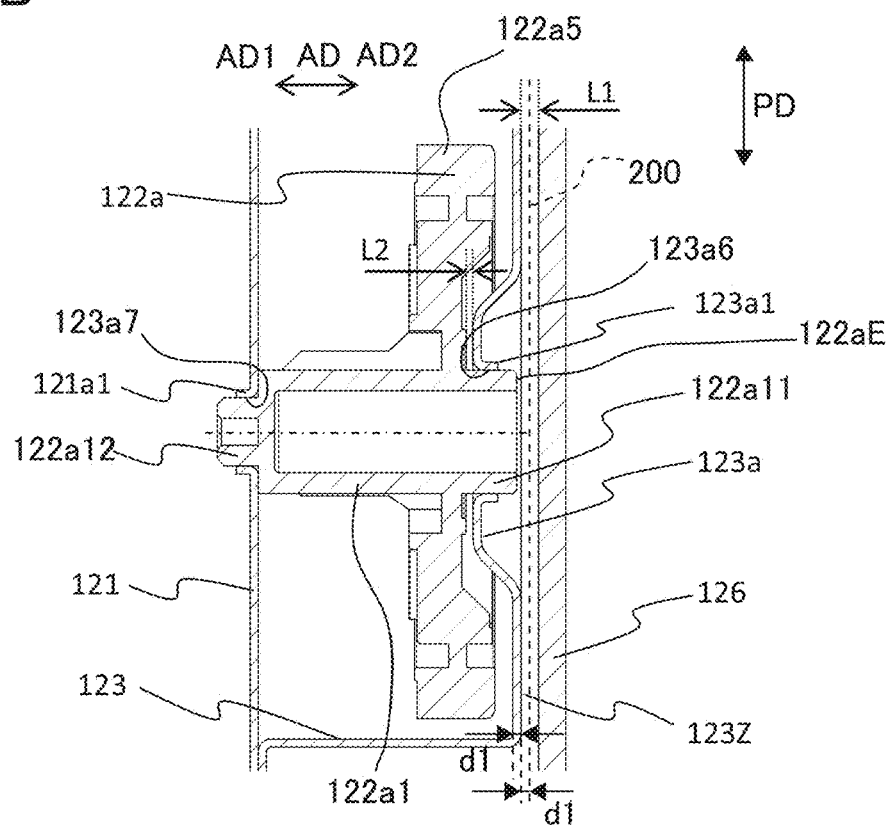
FIG. 4B is a cross-sectional view illustrating an X1-X1 cross section of FIG. 4A.

At first, with reference to FIGS. 4A and 4B, the configuration for supporting the gear 122a serving as a first gear of a type including the gear shaft portion 122a1 will be described. FIG. 4A is a perspective view illustrating the first drive gear train 122 and the first gear cover 123, and FIG. 4B is a cross-sectional view illustrating an X1-X1 cross section of FIG. 4A. In FIG. 4A, the exterior right cover 126 is not shown, and in FIG. 4B, the exterior right cover 126 is illustrated on the outer side of the first gear cover 123.

As illustrated in FIGS. 4A and 4B, the gear 122a includes the gear shaft portion 122a1 serving as a shaft portion that extends in the rotational axis direction AD, and a gear portion 122a5 that extends in an orthogonal direction PD extending orthogonally to the rotational axis direction AD from the gear shaft portion 122a1 and on which a plurality of teeth are formed. The gear shaft portion 122a1 includes a first end portion 122a11 which is a downstream end portion in the second direction AD2, and a second end portion 122a12 which is a downstream end in the first direction AD1.

The first gear cover 123 includes an outer surface 123Z that extends in the orthogonal direction PD, and a concave portion 123a serving as a first concave portion that is concaved in the first direction AD1 from the outer surface 123Z and that is arranged upstream of the right side plate 121 in the first direction AD1. The outer surface 123Z is a flat surface. The outer surface 123Z is a surface whose area in the orthogonal direction PD is maximum among the surfaces of the first gear cover 123 facing the second direction AD2, and which is a downstream end surface of the first gear cover 123 in the second direction AD2. In other words, the first gear cover 123 has a plurality of surfaces that face the second direction AD2. The outer surface 123Z is a surface whose area in the orthogonal direction PD is maximum among the plurality of surfaces. The outer surface 123Z is not necessarily the surface on the downstream end of the first gear cover 123 in the second direction AD2. In the present embodiment, the outer surface 123Z is a surface whose area in the orthogonal direction PD is maximum among all the surfaces of the first gear cover 123. Further according to the present embodiment, the outer surface 123Z is a surface whose area is maximum among all the surfaces of the first gear cover 123. As illustrated in FIG. 4B, the outer surface 123Z faces the exterior right cover 126. Further, the exterior right cover 126 is arranged downstream of the outer surface 123Z in the second direction AD2.

The concave portion 123a is formed by drawing. The gear shaft portion 122a1 including the first end portion 122a11 and the second end portion 122a12 are arranged within an area AR1 in which the concave portion 123a is formed when viewed in the first direction AD1.

As illustrated in FIG. 4B, the first gear cover 123 includes a burred portion 123a1 formed by burring, and the burred portion 123a1 is disposed within the concave portion 123a. Similarly, the right side plate 121 includes a burred portion 121a1 formed by burring, and the burred portion 121a1 is disposed at a position facing the burred portion 123a1 in the rotational axis direction AD. The first end portion 122a11 of the gear shaft portion 122a1 is supported rotatably by the burred portion 123a1 of the first gear cover 123. Further, the second end portion 122a12 of the gear shaft portion 122a1 is supported rotatably by the burred portion 121a1 of the right side plate 121. In other words, a hole 123a6 serving as a first hole formed by the burred portion 123a1 is disposed on the concave portion 123a, and the hole 123a7 formed by the burred portion 121a1 is disposed on the right side plate 121. The first end portion 122a11 of the gear shaft portion 122a1 passes through the hole 123a6 formed on the concave portion 123a, and the second end portion 122a12 of the gear shaft portion 122a1 passes through the hole 123a7 formed on the right side plate 121.

The first end portion 122a11 of the gear shaft portion 122a1 passes through the concave portion 123a and protrudes in the second direction AD2 with respect to the concave portion 123a. More specifically, the first end portion 122a11 of the gear shaft portion 122a1 passes through the hole 123a6 formed on the concave portion 123a and protrudes in the second direction AD2 with respect to the hole 123a6. Further, a downstream end 122aE in the second direction AD2 of the first end portion 122a11 is arranged upstream in the second direction AD2 of the outer surface 123Z. That is, the downstream end 122aE in the second direction AD2 of the gear shaft portion 122a1 is arranged on the inner side in the rotational axis direction AD of the outer surface 123Z. Moreover, the downstream end 122aE is a most downstream end of the first drive gear train 122 in the second direction AD2. That is, the plurality of gears constituting the first drive gear train 122 are present within a predetermined area in the second direction AD2. The most downstream end of the first drive gear train 122 in the second direction AD2 is equivalent to the downstream end of the area where the plurality of gears are present in the second direction AD2. In other words, if the plurality of gears are present within the area from a first position to a second position in a second direction AD, the most downstream end of the first drive gear train 122 is equivalent to the second position.

Therefore, it becomes possible to suppress a clearance L1, which is a distance between the outer surface 123Z of the first gear cover 123 and the exterior right cover 126 in the rotational axis direction AD, to a minimum, such that the image forming apparatus 100 may be downsized in the rotational axis direction AD.

Now, as illustrated in FIG. 4B, a virtual surface 200 set at a position shifted from the outer surface 123Z to the second direction AD2 for a distance corresponding to a plate thickness d1 of the first gear cover 123 is considered. The virtual surface, i.e., virtual plane, 200 is extended in an orthogonal direction PD. As described above, the downstream end 122aE of the gear shaft portion 122a1 is arranged upstream of the outer surface 123Z in the second direction AD2, such that it is arranged upstream of the virtual surface 200.

The gear 122a has a clearance L2 formed between the first gear cover 123 in the rotational axis direction AD. That is, the gear shaft portion 122a1 of the gear 122a is configured movably in the rotational axis direction AD corresponding to the clearance L2 serving as a predetermined distance by the burred portion 123a1 of the first gear cover 123 and the burred portion 121a1 of the right side plate 121.

In FIG. 4B, the gear 122a is in a state pressed downstream in the first direction AD1 against the right side plate 121. However, if the gear 122a is pressed downstream in the second direction AD2 against the first gear cover 123, the downstream end 122aE of the gear shaft portion 122a1 may protrude downstream in the second direction AD2 from the outer surface 123Z. In that case, by pressing the downstream end 122aE of the gear shaft portion 122a1 in the first direction AD1, the gear 122a is moved inward, such that the downstream end 122aE may be prevented from protruding outward from the outer surface 123Z, and the clearance L1 may be suppressed to a minimum.

In the present embodiment, the clearance L2 is set to be smaller than the plate thickness d1 of the first gear cover 123. Therefore, even if the gear 122a is pressed downstream in the second direction AD2 against the first gear cover 123, the downstream end 122aE of the gear shaft portion 122a1 will not protrude downstream in the second direction AD2 from the virtual surface 200.

As described above, according to the present embodiment, the clearance L2 is set smaller than the plate thickness d1, but the present technique is not limited thereto. That is, in a state where the gear 122a is pressed against the first gear cover 123, as long as the downstream end 122aE of the gear shaft portion 122a1 does not protrude downstream in the second direction AD2 from the virtual surface 200, the clearance L2 may be greater than the plate thickness d1.

Further, the clearance L1 between the outer surface 123Z of the first gear cover 123 and the exterior right cover 126 is set equal to or greater than the plate thickness d1 of the first gear cover 123 considering dimensional tolerance of components. Therefore, even if the gear 122a is pressed downstream in the second direction AD2 against the first gear cover 123, the downstream end 122aE of the gear shaft portion 122a1 will not interfere with the exterior right cover 126.

In the present embodiment, the configuration for supporting the gear 122a of the first drive gear train 122 has been described, but a gear 124a of the second drive gear train 124 may have a similar supporting configuration as the gear 122a. That is, as illustrated in FIG. 3A, the second gear cover 125 includes an outer surface 125Z and a concave portion 125a, wherein a gear shaft portion 124a1 of the gear 124a passes through the concave portion 125a and protrudes in the second direction AD2. The downstream end in the second direction AD2 of the gear shaft portion 124a1 is arranged upstream in the second direction AD2 of the virtual surface 200 and the outer surface 125Z.

Support Configuration of Shaft

Figure 5A:
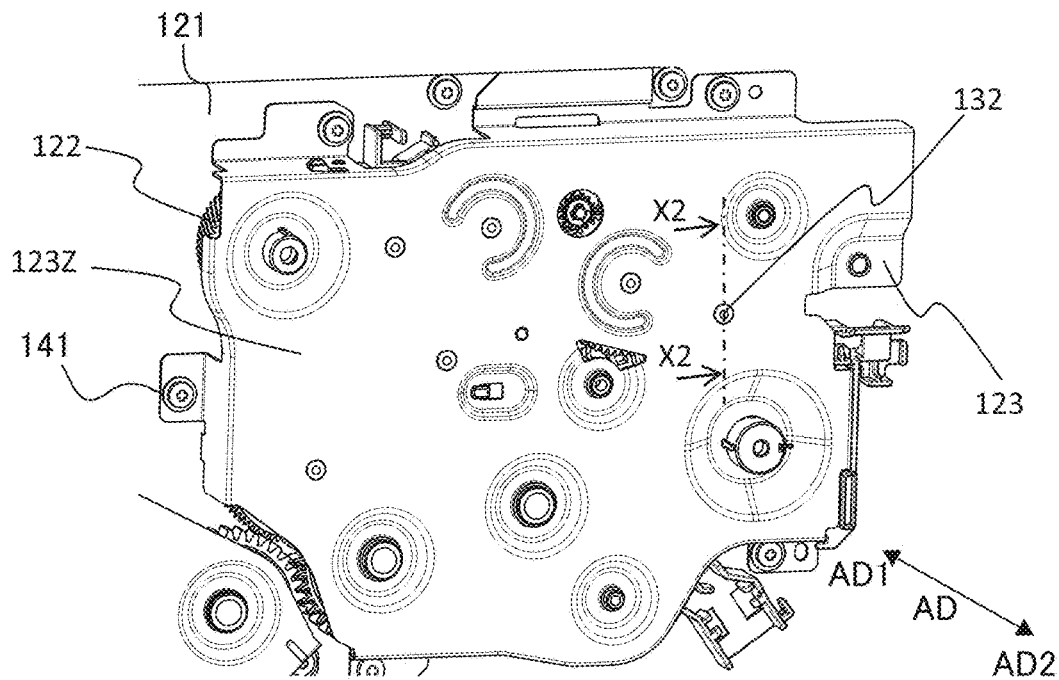
FIG. 5A is a perspective view illustrating the first drive gear train and the first gear cover.
Figure 5B:
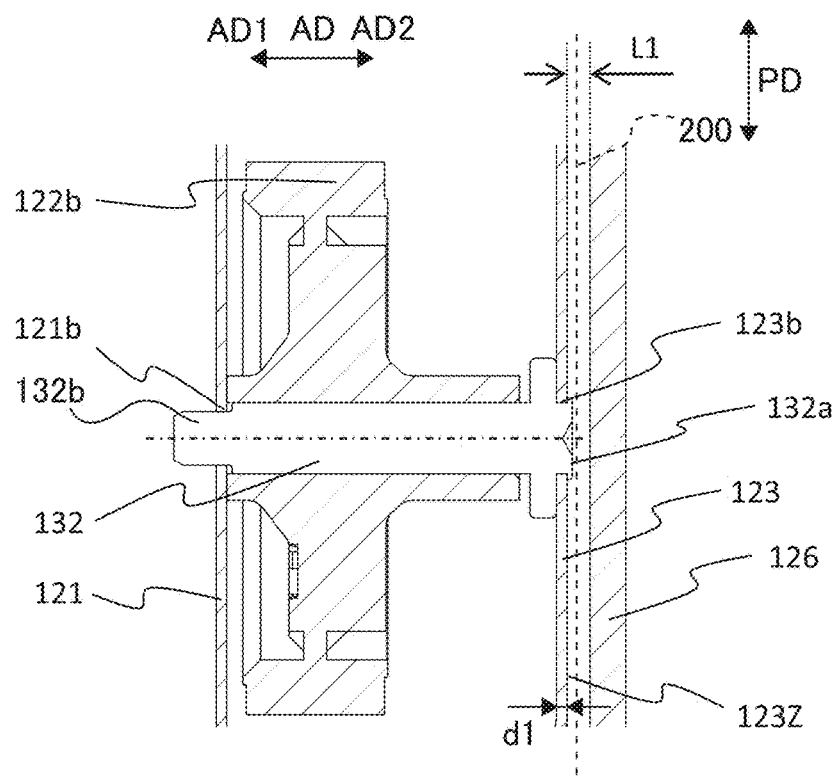
FIG. 5B is a cross-sectional view illustrating an X2-X2 cross section of FIG. 5A.

Next, with reference to FIG. 5, a configuration for rotatably supporting the shaft 132 that supports the gear 122b will be described. FIG. 5A is a perspective view illustrating the first drive gear train 122 and the first gear cover 123, and FIG. 5B is a cross-sectional view illustrating an X2-X2 cross section of FIG. 5A. Further, in FIG. 5A, the exterior right cover 126 is not shown, whereas in FIG. 5B, the exterior right cover 126 is illustrated on the outer side of the first gear cover 123.

As illustrated in FIGS. 5A and 5B, the gear 122b of the first drive gear train 122 is supported rotatably on the shaft 132 that extends in the rotational axis direction AD. The shaft 132 includes a first end portion 132a which is a downstream end portion in the second direction AD2, and a second end portion 132b which is a downstream end portion in the first direction AD1. The second end portion 132b of the shaft 132 is supported by a hole portion 121b on the right side plate 121.

The first end portion 132a of the shaft 132 is supported on a hole portion 123b of the first gear cover 123, and by being caulk-joined to the first gear cover 123, the movement thereof in the rotational axis direction AD is regulated. The first end portion 132a is slightly protruded in the second direction AD2 from the outer surface 123Z of the first gear cover 123.

Caulk-joining of the first end portion 132a is a method in which the portion of the first end portion 132a protruded downstream in the second direction AD2 from the hole portion 123b of the first gear cover 123 is pressed so that it is crushed, plastically deformed, and thereby joined to the first gear cover 123.

Therefore, the amount of protrusion of the first end portion 132a in the second direction AD2 with respect to the outer surface 123Z of the first gear cover 123 is small, and it is equal to or less than the plate thickness d1 of the first gear cover 123. That is, the first end portion 132a is arranged upstream in the second direction AD2 of the virtual surface 200 described above.

The clearance L1, which is the distance between the outer surface 123Z of the first gear cover 123 and the exterior right cover 126 in the rotational axis direction AD, is greater than the plate thickness d1 of the first gear cover 123, such that the first end portion 132a of the shaft 132 does not interfere with the exterior right cover 126. Therefore, the clearance L1 may be suppressed to a minimum, and the image forming apparatus 100 may be downsized in the rotational axis direction AD.

Support Configuration of Bearing Member

Figure 6A:
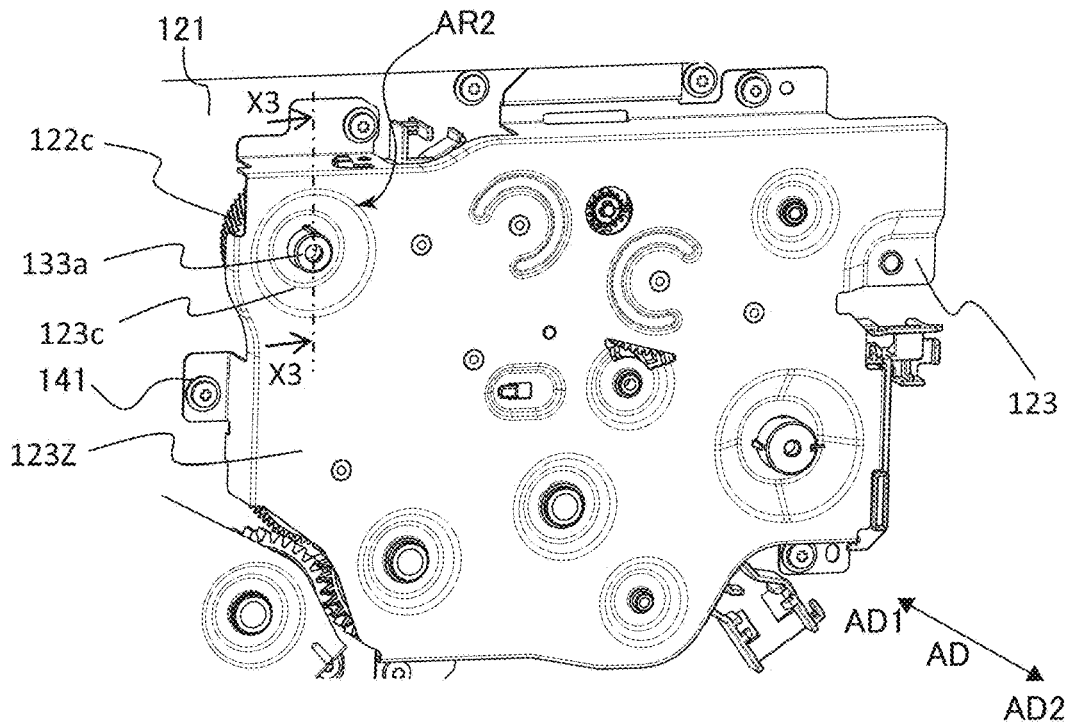
FIG. 6A is a perspective view illustrating the first drive gear train and the first gear cover.
Figure 6B:
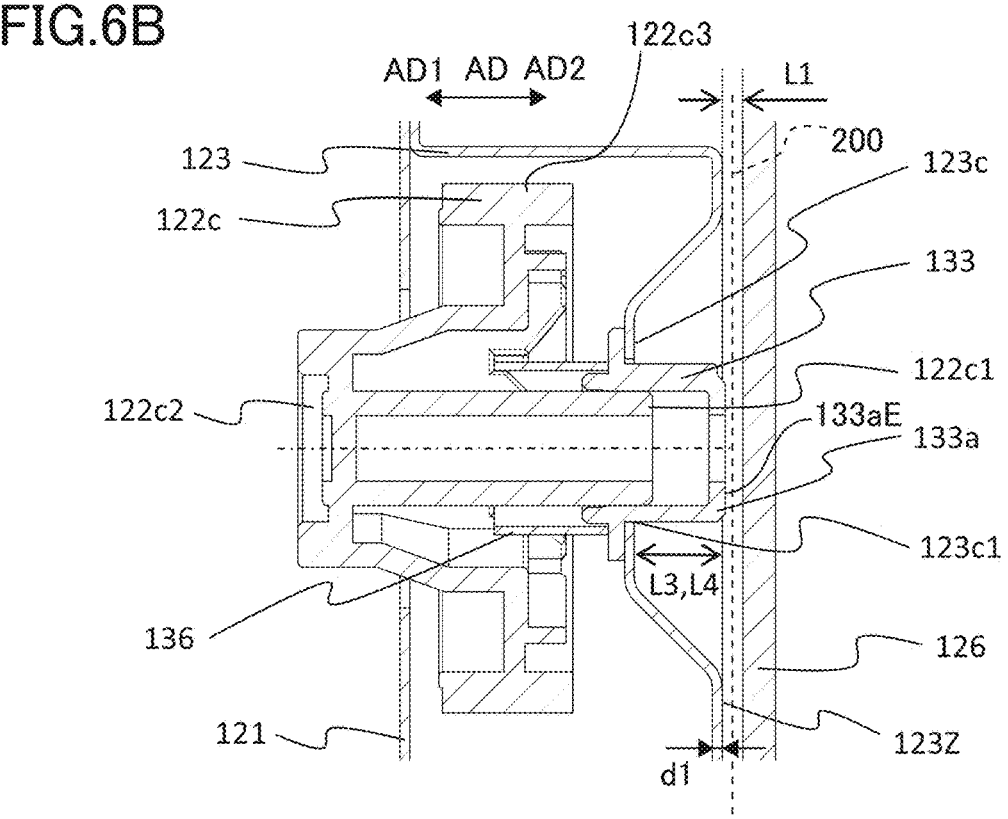
FIG. 6B is a cross-sectional view illustrating an X3-X3 cross section of FIG. 6A.

Next, with reference to FIG. 6, a configuration for supporting the bearing member 133 that rotatably supports the gear 122c of the first drive gear train 122 will be described. FIG. 6A is a perspective view illustrating the first drive gear train 122 and the first gear cover 123, and FIG. 6B is a cross-sectional view illustrating an X3-X3 cross section of FIG. 6A. Further, in FIG. 6A, the exterior right cover 126 is not shown, whereas in FIG. 6B, the exterior right cover 126 is illustrated on the outer side of the first gear cover 123.

As illustrated in FIGS. 6A and 6B, the gear 122c serving as a second gear includes a gear shaft portion 122c1 that extends in the rotational axis direction AD, a coupling portion 122c2 that is disposed at a downstream end in the first direction AD1 of the gear shaft portion 122c1, and a gear portion 122c3. The coupling portion 122c2 serving as a second coupling portion is engaged with a coupling portion not shown serving as a first coupling portion, such that drive is transmitted between the coupling portions. The gear portion 122c3 extends in the orthogonal direction PD from the gear shaft portion 122c1, and a plurality of teeth are formed thereon.

The gear shaft portion 122c1 of the gear 122c is rotatably supported by the bearing member 133, and the bearing member 133 is supported by a hole portion 123c1 serving as a hole on the first gear cover 123 and a second hole. Further, an urging member 136 formed, for example, of a coil spring is disposed in a contracted manner between the bearing member 133 and the gear 122c in the rotational axis direction AD. The urging member 136 urges the gear 122c and the bearing member 133 to be separated from each other in the rotational axis direction AD. That is, the urging member 136 urges the coupling portion 122c2 in the first direction AD1 so as to engage the same with another coupling portion opposed to the coupling portion 122c2. The urging member 136 is not limited to a coil spring, and other elastic members such as a disk spring or a torsion bar may be applied, or materials such as sponge or elastic rubber may be applied.

The first gear cover 123 includes a concave portion 123c serving as a second concave portion concaved in the first direction AD1 from the outer surface 123Z descried above. The hole portion 123c1 is disposed on the concave portion 123c. The concave portion 123c is formed through drawing. The bearing member 133 and the gear shaft portion 122c1 are disposed within an area AR2 on which the concave portion 123c is formed when viewed in the first direction AD1.

The bearing member 133 includes a protruded portion 133a that passes through the concave portion 123c and protrudes in the second direction AD2 from the concave portion 123c. More specifically, the protruded portion 133a of the bearing member 133 passes through the hole portion 123c1 disposed on the concave portion 123c and protrudes in the second direction AD2 from the hole portion 123c1. The downstream end 133aE of the protruded portion 133a in the second direction AD2 protrudes slightly from the outer surface 123Z of the first gear cover 123 in the second direction AD2. The bearing member 133 is configured movably in the first direction AD1 against the urging force of the urging member 136.

In FIG. 6B, the gear 122c is in a state pressed downstream in the second direction AD2 against the first gear cover 123 by urging force of the urging member 136. In this state, the downstream end 133aE of the protruded portion 133a is arranged between the outer surface 123Z of the first gear cover 123 and the virtual surface 200 in the rotational axis direction AD. That is, the downstream end 133aE is arranged upstream in the second direction AD2 of the virtual surface 200. In other words, the amount of protrusion of the downstream end 133aE in the second direction AD2 with respect to the outer surface 123Z of the first gear cover 123 is equal to or smaller than the plate thickness d1 of the first gear cover 123.

The clearance L1, which is the distance between the outer surface 123Z of the first gear cover 123 and the exterior right cover 126 in the rotational axis direction AD, is greater than the plate thickness d1 of the first gear cover 123, such that the downstream end 133aE of the protruded portion 133a does not interfere with the exterior right cover 126. Therefore, the clearance L1 may be suppressed to a minimum, and the image forming apparatus 100 may be downsized in the rotational axis direction AD.

Further, by pressing the bearing member 133 in the first direction AD1 against the urging force of the urging member 136, it becomes possible to prevent the downstream end 133aE from protruding to the outer side from the outer surface 123Z, such that the clearance L1 may be suppressed to a minimum.

Further according to the present embodiment, a height L3 of the concave portion 123c, that is, the distance from the bottom surface of the concave portion 123c to the outer surface 123Z, is equivalent to an amount of protrusion L4 of the protruded portion 133a from the concave portion 123c. The amount of protrusion L4 is preferably smaller than a length having added the plate thickness d1 to the height L3, and by changing the height L3 according to the amount of protrusion L4, the clearance L1 may be reduced. For example, if the amount of protrusion L4 is greater than the clearance L1, it is preferable for the height L3 to also be greater than the clearance L1.

Configuration of Motor and Actuator

Figure 7A:
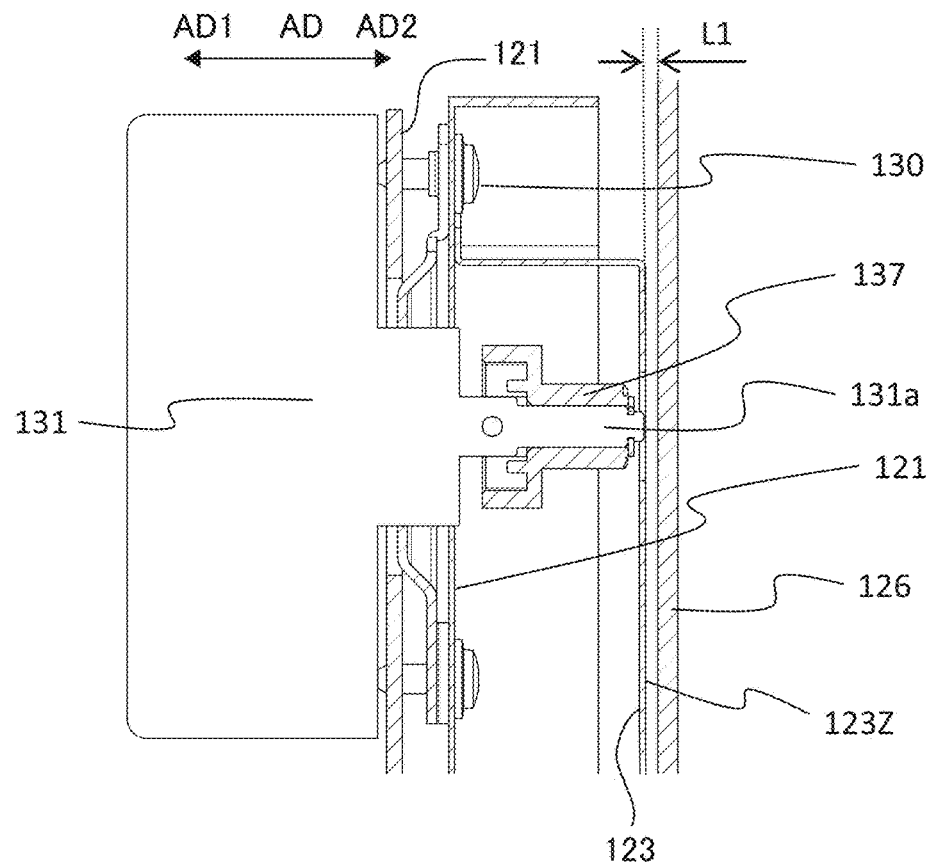
FIG. 7A is a cross-sectional view illustrating a motor.

Next, with reference to FIGS. 7A and 7B, the configuration of the motor 131 and the actuator 134 will be described. FIG. 7A is a cross-sectional view illustrating the motor 131, and FIG. 7B is a cross-sectional view illustrating the solenoid 134b disposed on the second drive gear train 124 side.

As illustrated in FIG. 7A, the motor 131 is arranged downstream of the right side plate 121 in the first direction AD1, and fixed to the right side plate 121 via a screw 130. The motor 131 includes a shaft portion 131a which is driven to rotate, and a pinion gear 137 is attached to the shaft portion 131a. The pinion gear 137 is arranged to be overlapped in the rotational axis direction AD with at least a portion of the gears of the first drive gear train 122 and the second drive gear train 124. The gear being overlapped with the pinion gear 137 in the rotational axis direction AD include gears 122a, 122b, and 122c. Further, the pinion gear 137 is arranged upstream of the outer surface 123Z of the first gear cover 123 in the second direction AD2.

The motor 131 including the shaft portion 131a and the pinion gear 137 illustrated in FIG. 7A is arranged downstream of the outer surface 123Z of the first gear cover 123 in the first direction AD1. As described, the motor 131 and the pinion gear 137 do not protrude outward in the rotational axis direction AD from the outer surface 123Z of the first gear cover 123. Therefore, the clearance L1 between the outer surface 123Z and the exterior right cover 126 may be suppressed to a minimum.

Figure 7B:
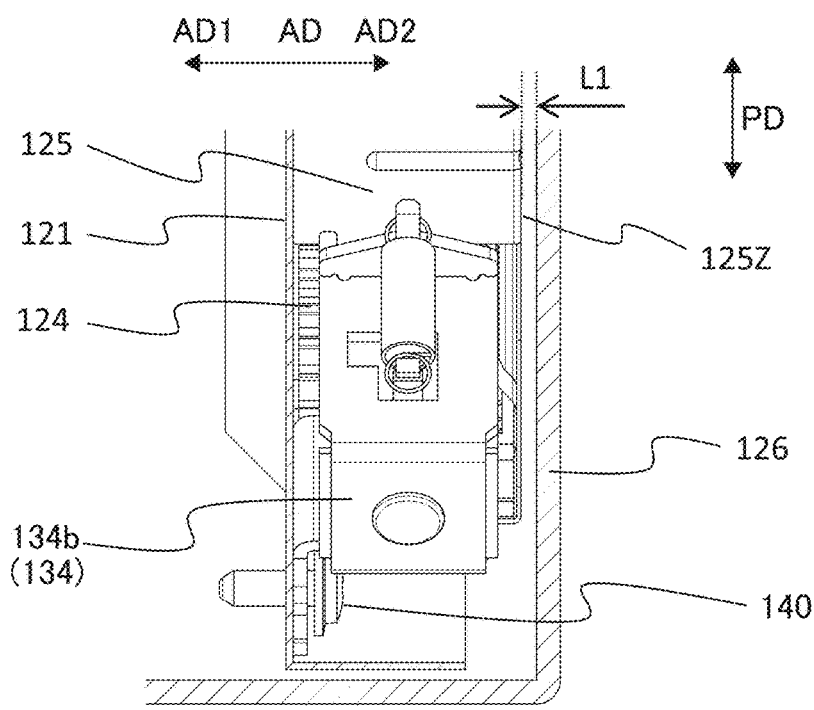
FIG. 7B is a cross-sectional view illustrating a solenoid arranged on a second drive gear train side.

As illustrated in FIG. 7B, the solenoid 134b is arranged upstream of the right side plate 121 in the first direction AD1, and fixed to the right side plate 121 via a screw 140. Further, the second drive gear train 124 arranged near the solenoid 134b is supported by the second gear cover 125. The second gear cover 125 includes the outer surface 125Z extending in the orthogonal direction PD. The outer surface 125Z of the second gear cover 125 is flush with the outer surface 123Z of the first gear cover 123. The outer surface 125Z is a surface of the second gear cover 125 having a maximum area that extends in parallel to the orthogonal direction PD, and which is a downstream end surface in the second direction AD2 of the second gear cover 125. Further, the outer surface 125Z is not necessarily the downstream end surface in the second direction AD2 of the second gear cover 125.

The solenoid 134b illustrated in FIG. 7B is arranged on the inner side of the outer surface 125Z. As described, the solenoid 134b is not protruded outward in the rotational axis direction from the outer surface 125Z of the second gear cover 125, and the outer surface 125Z is flush with the outer surface 123Z. Further, the plate thickness of the second gear cover 125 is the same as the plate thickness d1 of the first gear cover 123. Therefore, the clearance L1 between the exterior right cover 126 and the outer surface 125Z of the second gear cover 125 and also the outer surface 123Z of the first gear cover 123 may be suppressed to a minimum.

Further, in FIGS. 7A and 7B, the configuration and arrangement of the motor and the solenoid serving as the actuator are illustrated, but the present technique is not limited thereto. For example, the electromagnetic clutch 134a (refer to FIG. 2) is arranged so as not to protrude outward in the rotational axis direction AD from the outer surface 123Z of the first gear cover 123, and the same applies for other actuators.

Configuration of Bundle Wire Guide

Figure 8A:
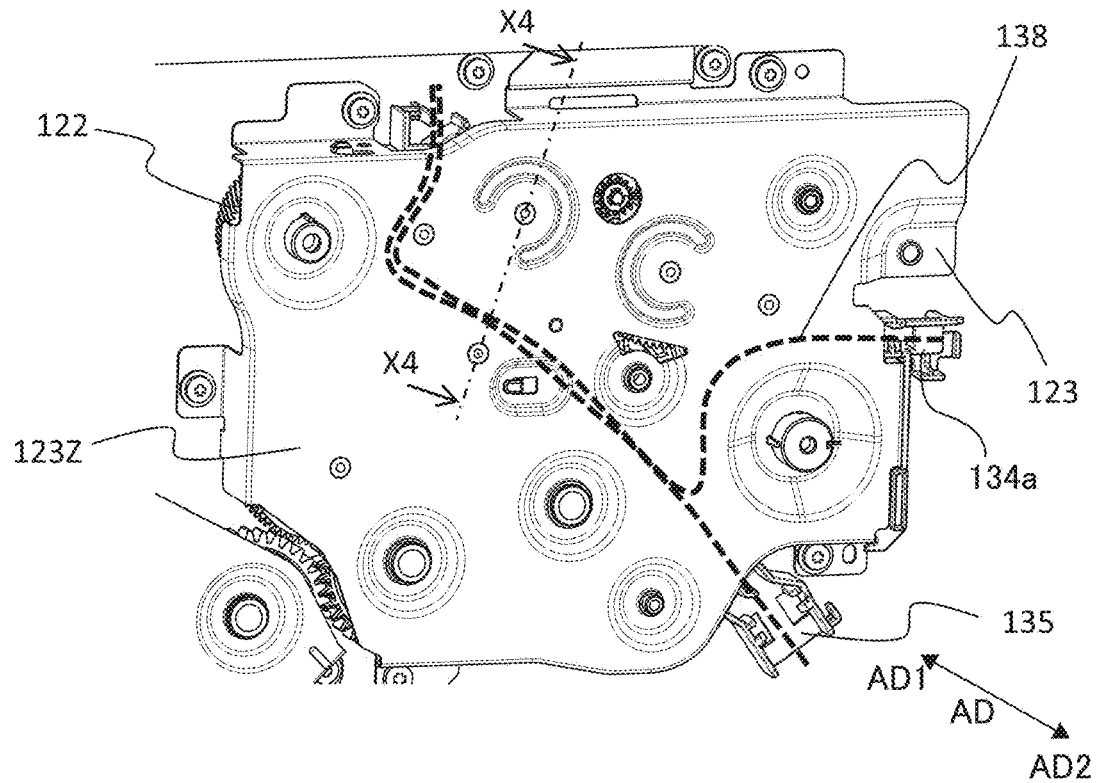
FIG. 8A is a perspective view illustrating the first drive gear train, the first gear cover, and a bundle wire guide.
Figure 8B:
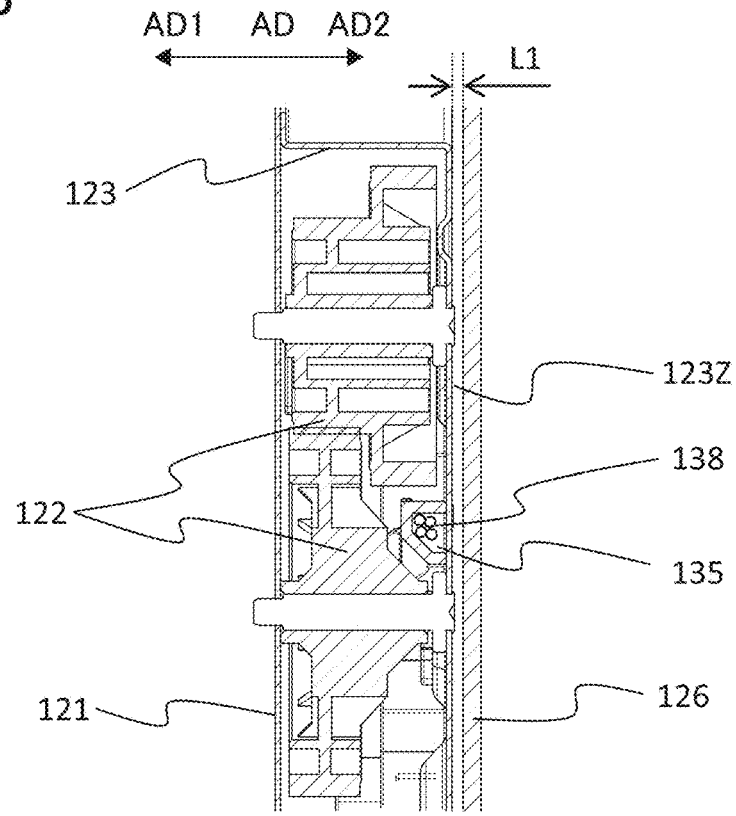
FIG. 8B is a cross-sectional view illustrating an X4-X4 cross section of FIG. 8A.

Next, with reference to FIGS. 8A and 8B, the configuration of the bundle wire guide 135 will be described. FIG. 8A is a perspective view illustrating the first drive gear train 122, the first gear cover 123, and the bundle wire guide 135, and FIG. 8B is a cross-sectional view illustrating an X4-X4 cross section of FIG. 8A. In FIG. 8A, the exterior right cover 126 is not shown, whereas in FIG. 8B, the exterior right cover 126 is illustrated on the outer side of the first gear cover 123.

The bundle wire guide 135 is attached to the first gear cover 123 as a member for guiding the cable 138 that connects the electromagnetic clutch 134a and the solenoid 134b to an electric board not shown, and it is arranged between gears of the first drive gear train 122. The cable 138 serving as a bundle wire supplies power to the electromagnetic clutch 134a and the solenoid 134b serving as the actuator. As illustrated in FIGS. 8A and 8B, the bundle wire guide 135 is arranged between the right side plate 121 and the first gear cover 123 in the rotational axis direction AD, and on the inner side of the first gear cover 123. The cable 138 is arranged to be surrounded by the bundle wire guide 135 and the first gear cover 123, and passed through the gears of the first drive gear train 122.

As illustrated in FIG. 8B, the bundle wire guide 135 is arranged on the inner side in the rotational axis direction AD from the outer surface 123Z of the first gear cover 123. As described, since the bundle wire guide 135 is not protruded in the rotational axis direction AD from the outer surface 123Z of the first gear cover, the clearance L1 between the outer surface 123Z and the exterior right cover 126 may be suppressed to a minimum.

As described above, the motor 131, the pinion gear 137, the solenoid 134b, and the bundle wire guide 135 are arranged upstream in the second direction AD2 of the outer surface 123Z, such that they are naturally arranged upstream of the virtual surface 200.

Configuration of Screw

According to the present embodiment, the screws 130, 140, 141, and 142 are engaged to the right side plate 121, such that they are arranged on the inner side in the rotational axis direction AD from the outer surface 123Z of the first gear cover 123. Therefore, the clearance L1 between the outer surface 123Z and the exterior right cover 126 may be suppressed to a minimum.

Modified Example

Next, a configuration of a screw 150 serving as a modified example will be described. Depending on the drive configuration, there may be a case where the screw is preferably screwed onto the first gear cover 123 instead of the right side plate 121. The screw 150 serving as a modified example is fastened to the first gear cover 123.

Figure 9:
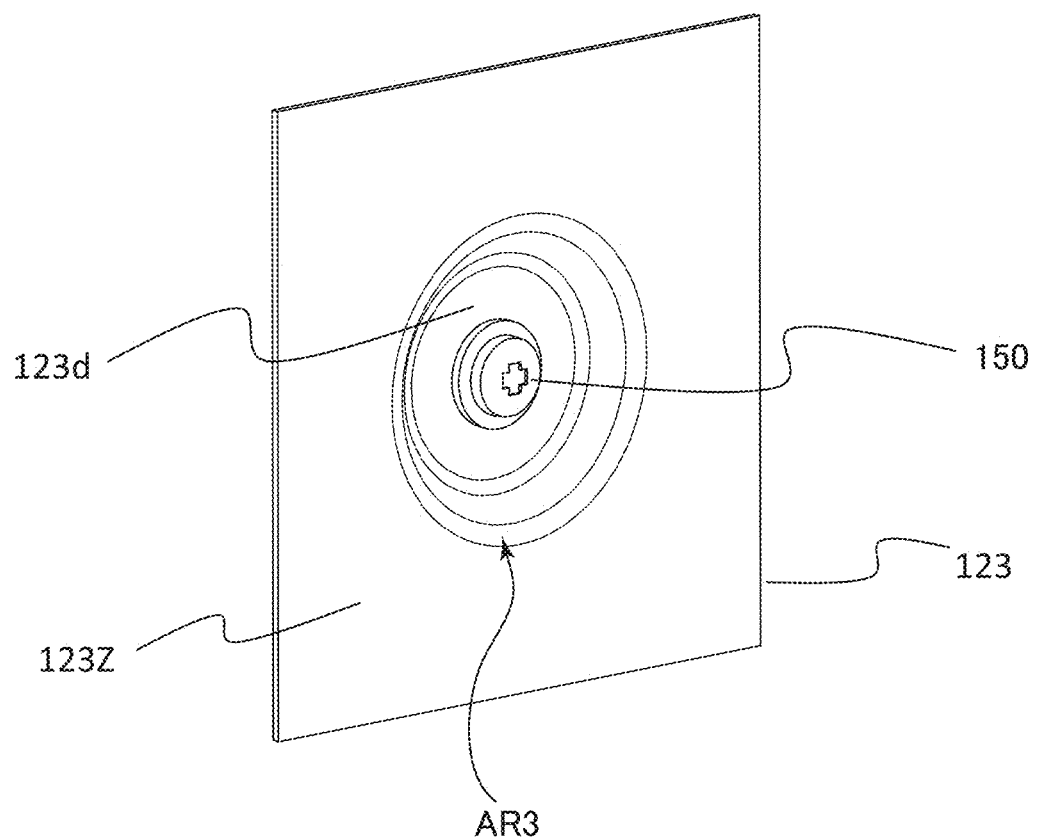
FIG. 9 is a perspective view illustrating a screw according to a modified example.

As illustrated in FIG. 9 the first gear cover 123 includes the outer surface 123Z, and a concave portion 123d that is concaved in the first direction AD1 from the outer surface 123Z. The concave portion 123d is formed by drawing. The screw 150 is arranged within an area AR3 on which the concave portion 123d is formed when viewed in the first direction AD1.

That is, the screw 150 is fastened to the concave portion 123d of the first gear cover 123, and arranged upstream of the outer surface 123Z in the second direction AD2. Further, the screw 150 is arranged upstream of the virtual surface 200 (refer to FIG. 4B) in the second direction AD2. Thereby, the clearance L1, which is a distance between the outer surface 123Z and the exterior right cover 126, may be suppressed to a minimum, and the image forming apparatus 100 may be downsized in the rotational axis direction AD.

As described, according to the present embodiment, the gear shaft portion 122a1, the shaft 132, the bearing member 133, the actuator 134, the bundle wire guide 135, and the screws are all disposed upstream in the second direction AD2 of the virtual surface 200. That is, the gear shaft portion 122a1, the shaft 132, the bearing member 133, the actuator 134, the bundle wire guide 135, and the screws do not protrude in the rotational axis direction AD to the outer side of the virtual surface 200. The virtual surface 200 is at a position shifted to the second direction AD2 for a distance corresponding to the plate thickness d1 from the outer surface 123Z of the first gear cover 123 and the outer surface 123Z of the second gear cover 125.

Therefore, the clearance L1 between the outer surface 123Z and the exterior right cover 126 may be suppressed to a minimum, and the image forming apparatus 100 may be downsized in the rotational axis direction AD. For example, a distance corresponding to the plate thickness d1 should be ensured as the clearance L1.

Other Embodiments

The present embodiment has been illustrated based on an example where the motor 131 and the drive transmission unit 120 are disposed on the right side plate 121 side, but the present technique is not limited thereto. For example, the motor 131 and the drive transmission unit 120 may be disposed on the left side plate 112 side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-103430, filed Jun. 23, 2023, which is hereby incorporated by reference herein in its entirety.

What is claimed is:

1. An image forming apparatus configured to form an image on a sheet, the image forming apparatus comprising:
   a driven member;
   a frame body configured to support the driven member;
   a driving source configured to generate a driving force; and
   a drive transmission unit configured to transmit the driving force of the driving source to the driven member, the drive transmission unit including a gear train including a first gear configured to rotate by the driving force from the driving source, and a gear cover configured to cover the gear train,
   wherein the gear cover includes an outer surface that extends in an orthogonal direction orthogonal to a rotational axis direction of the first gear, and a first concave portion that is concaved in a first direction parallel to the rotational axis direction from the outer surface, the gear cover being arranged upstream of the frame body in the first direction,
   wherein the first gear includes a shaft portion that passes through a first hole formed on the first concave portion and that protrudes to a second direction opposite to the first direction from the first hole,
   wherein the outer surface is a surface having a maximum area in the orthogonal direction among surfaces of the gear cover facing the second direction, and
   wherein a downstream end, in the second direction, of the shaft portion is a most downstream end of the gear train in the second direction and is arranged upstream of a virtual surface in the second direction, the virtual surface being positioned at a distance shifted to the second direction for a distance corresponding to a plate thickness of the gear cover from the outer surface, the virtual surface being extended in the orthogonal direction.

2. The image forming apparatus according to claim 1, wherein the shaft portion is rotatably supported on the frame body and the gear cover, and
   wherein the downstream end of the shaft portion is arranged upstream of the outer surface in the second direction in a state where the shaft portion is pressed downstream in the first direction against the frame body.

3. The image forming apparatus according to claim 2, wherein the shaft portion is movable for a predetermined distance in the rotational axis direction, and
   wherein the predetermined distance is smaller than the plate thickness of the gear cover.

4. The image forming apparatus according to claim 1, wherein the gear train includes a second gear,
   wherein the drive transmission unit includes a bearing member that rotatably supports a shaft portion of the second gear,
   wherein the gear cover includes a second concave portion that is concaved in the first direction from the outer surface,
   wherein the bearing member includes a protruded portion that passes through a second hole formed on the second concave portion and that protrudes to the second direction from the second hole, and
   wherein a downstream end, in the second direction, of the protruded portion is arranged upstream of the virtual surface in the second direction.

5. The image forming apparatus according to claim 1, wherein the gear cover is formed of a sheet metal.

6. The image forming apparatus according to claim 5, wherein the first concave portion is formed by drawing.

7. The image forming apparatus according to claim 1, further comprising an exterior member that is arranged downstream of the outer surface in the second direction and faces the outer surface,
   wherein a distance in the rotational axis direction between the outer surface of the gear cover and the exterior member is greater than the plate thickness.

8. The image forming apparatus according to claim 1, wherein the drive transmission unit includes an actuator, a bundle wire configured to supply power to the actuator, and a bundle wire guide configured to guide the bundle wire, and
   wherein the actuator, the bundle wire, and the bundle wire guide are arranged upstream of the virtual surface in the second direction.

9. The image forming apparatus according to claim 1, wherein the drive transmission unit includes a screw engaged to the gear cover, and
   wherein the screw is arranged upstream of the virtual surface in the second direction.

10. The image forming apparatus according to claim 1, wherein the outer surface is a downstream end surface, in the second direction of, the gear cover.

11. The image forming apparatus according to claim 1, further comprising a pinion gear configured to be attached to the driving source,
    wherein the pinion gear is arranged to be overlapped with the first gear in the rotational axis direction, and arranged upstream of the outer surface in the second direction.

12. The image forming apparatus according to claim 1, wherein the driven member includes an image bearing member configured to bear a toner image.

13. The image forming apparatus according to claim 1, wherein the driven member includes a roller configured to convey a sheet.

14. The image forming apparatus according to claim 1, wherein the driving source is arranged downstream of the outer surface in the first direction.

15. An image forming apparatus configured to form an image on a sheet, the image forming apparatus comprising:
a driven member;
a frame body configured to support the driven member;
a driving source configured to generate a driving force; and
a drive transmission unit configured to transmit the driving force of the driving source to the driven member, the drive transmission unit including a gear train including a gear configured to rotate by the driving force from the driving source, a gear cover configured to cover the gear train, and a bearing member configured to rotatably support a shaft portion of the gear,
wherein the gear cover includes an outer surface that extends in an orthogonal direction orthogonal to a rotational axis direction of the gear, and a concave portion that is concaved in a first direction parallel to the rotational axis direction from the outer surface, the gear cover being arranged upstream of the frame body in the first direction,
wherein the bearing member includes a protruded portion that passes through a hole formed on the concave portion and that protrudes to a second direction opposite to the first direction from the hole,
wherein the outer surface is a surface having a maximum area in the orthogonal direction among surfaces of the gear cover facing the second direction, and
wherein a downstream end, in the second direction, of the protruded portion is arranged upstream of a virtual surface in the second direction, the virtual surface being positioned at a distance shifted to the second direction for a distance corresponding to a plate thickness of the gear cover from the outer surface, the virtual surface being extended in the orthogonal direction.

16. The image forming apparatus according to claim 15, wherein the drive transmission unit includes an urging member that is disposed in a contracted manner between the gear and the bearing member and is configured to urge the gear and the bearing member to be separated from each other in the rotational axis direction, and
wherein the downstream end of the protruded portion is positioned between the outer surface of the gear cover and the virtual surface in a state where the bearing member is pressed downstream in the second direction against the gear cover by an urging force of the urging member.

17. The image forming apparatus according to claim 15, wherein a second coupling portion configured to transmit drive to a first coupling portion by being engaged with the first coupling portion is disposed at a downstream end portion, in the first direction, of the gear.

18. The image forming apparatus according to claim 15, wherein the gear cover is formed of a sheet metal.

19. The image forming apparatus according to claim 15, wherein the concave portion is formed by drawing.

20. The image forming apparatus according to claim 15, further comprising an exterior member that is arranged downstream of the outer surface in the second direction and faces the outer surface, and
wherein a distance in the rotational axis direction between the outer surface of the gear cover and the exterior member is greater than the plate thickness.

21. The image forming apparatus according to claim 15, wherein the drive transmission unit includes an actuator, a bundle wire configured to supply power to the actuator, and a bundle wire guide configured to guide the bundle wire, and
wherein the actuator, the bundle wire, and the bundle wire guide are arranged upstream of the virtual surface in the second direction.

22. The image forming apparatus according to claim 15, wherein the drive transmission unit includes a screw engaged to the gear cover, and
wherein the screw is arranged upstream in the second direction of the virtual surface.

23. The image forming apparatus according to claim 15, wherein the outer surface is a downstream end surface of the gear cover in the second direction.

24. The image forming apparatus according to claim 15, further comprising a pinion gear configured to be attached to the driving source,
wherein the pinion gear is arranged to be overlapped with the gear in the rotational axis direction, and arranged upstream of the outer surface in the second direction.

25. The image forming apparatus according to claim 15, wherein the driven member includes an image bearing member configured to bear a toner image.

26. The image forming apparatus according to claim 15, wherein the driven member includes a roller configured to convey a sheet.

27. The image forming apparatus according to claim 15, wherein the driving source is arranged downstream of the outer surface in the first direction.

* * * * *